United States Patent [19]

Quehl

[11] 4,165,404
[45] Aug. 21, 1979

[54] PROCESS FOR PRODUCING LAMINATES OF FABRIC AND FLUOROCARBON COPOLYMER

[75] Inventor: Henry E. Quehl, Norwalk, Conn.

[73] Assignee: E. I. Du Pont de Nemours and Company, Wilmington, Del.

[21] Appl. No.: 850,697

[22] Filed: Nov. 11, 1977

Related U.S. Application Data

[63] Continuation-in-part of Ser. No. 617,053, Sep. 26, 1975, abandoned, which is a continuation-in-part of Ser. No. 689,386, May 24, 1976, abandoned.

[51] Int. Cl.² .................. B32B 15/02; B32B 27/06
[52] U.S. Cl. .................. 428/212; 138/141; 156/309; 156/333; 427/412; 428/215; 428/421; 428/251; 428/422; 428/253; 138/DIG. 3
[58] Field of Search .......... 156/333, 309, 306, 72; 427/412; 526/254; 428/96, 251, 212, 253, 213, 421, 215, 422; 138/141, DIG. 3

[56] References Cited

U.S. PATENT DOCUMENTS

| | | | |
|---|---|---|---|
| 2,731,068 | 1/1956 | Richards | 138/DIG. 3 |
| 2,765,837 | 10/1956 | Kenyon | 156/309 |
| 2,783,173 | 2/1957 | Walker et al. | 138/DIG. 3 |
| 2,833,686 | 5/1958 | Sandt | 428/422 |
| 2,946,763 | 7/1960 | Bro et al. | 260/900 |
| 2,955,974 | 10/1960 | Allen et al. | 428/421 |
| 2,989,433 | 6/1961 | Yuan | 156/313 |
| 3,086,071 | 4/1963 | Preston | 174/117 |
| 3,107,197 | 10/1963 | Stein et al. | 156/309 |
| 3,108,018 | 10/1963 | Lewis | 428/422 |
| 3,159,609 | 12/1964 | Harris et al. | 526/247 |
| 3,389,749 | 6/1968 | Towns et al. | 156/245 |
| 3,501,360 | 3/1970 | Mancel | 156/153 |
| 3,623,903 | 11/1971 | Dislich et al. | 428/392 |
| 3,723,234 | 3/1973 | Mac Donald | 138/109 |
| 3,767,500 | 10/1973 | Tally et al. | 156/184 |
| 3,770,711 | 11/1973 | Hartig et al. | 428/36 |
| 3,790,403 | 2/1974 | Ribbans | 428/251 |
| 3,850,674 | 11/1974 | Clarke et al. | 428/421 |
| 3,934,064 | 1/1976 | Lowthian | 428/253 |
| 3,946,136 | 3/1976 | Fitz et al. | 428/422 |

FOREIGN PATENT DOCUMENTS 1363596  8/1974  United Kingdom .

OTHER PUBLICATIONS

Lovell, "Fep Laminates", *Materials Engineering*, pp. 721-722, 1-1972.
Goldman et al., "How to Use Fluorocarbon Plastics as Bonding Agents", *Adhesives Age*, pp. 30-34, 2-1967.
Du Pont Information Bulletin, "Teflon ® 100 Fep Fluorocarbon Resin", 14 pages.

*Primary Examiner*—John T. Goolkasian
*Assistant Examiner*—J. J. Gallagher

[57] ABSTRACT

An improvement in a process for preparing a laminate consisting of a fluorocarbon copolymer sheet of 5 or more mill thickness and a fabric is disclosed. The improvement is using a thin sheet of a fluorocarbon copolymer having a specific melt viscosity low enough to enable the copolymer to wet and penetrate the fabric at fabrication temperatures as an interlayer between the fabric and thick fluorocarbon copolymer sheet and then integrally bonding the laminate by means of heat and pressure. The use of the interlayer increases the level of adhesion between the thick sheet and the fabric.

4 Claims, No Drawings

PROCESS FOR PRODUCING LAMINATES OF FABRIC AND FLUOROCARBON COPOLYMER

CROSS-REFERENCE TO RELATED APPLICATIONS

This application is a continuation-in-part application of U.S. patent application Ser. No. 617,053 filed Sept. 26, 1975 now abandoned and which is a continuation-in-part application of copending application Ser. No. 689,386, filed May 24, 1976, now abandoned.

BACKGROUND OF THE INVENTION

1. Field of the Invention

This invention relates to a process for producing laminates of fabric and fluorocarbon copolymer.

2. Prior Art of the Invention

Various methods for producing laminates of fabric and thermoplastic resin are well known in the art. These methods include (1) calendaring a thermoplastic resin upon a fabric;

(2) dipping the fabric into an aqueous dispersion of thermoplastic resin;

(3) coating the fabric with an adhesive and then laminating a sheet of thermoplastic resin to it; and (4) coating a sheet of thermoplastic resin with adhesive and then laminating it to fabric.

For example, U.S. Pat. No. 3,446,686 discloses laminating sheets of thermoplastic material to fabric for reinforcing purposes, followed by forming a shaped article from the resultant laminate. This is accomplished by placing a sheet of thermoplastic material over an adhesive-coated surface of a knitted glass fabric, heating the sheet of thermoplastic material and drawing the sheet and fabric into the mold to form the shaped article. Upon cooling, the adhesive adheres the fabric to the molded sheet of thermoplastic material. This approach has a disadvantage of the adhesive being a weak point in the laminate.

The present invention produces a laminate of fabric and fluorocarbon copolymer which has higher adhesion between the components. This higher adhesion is produced by utilizing a process which places a thin sheet of fluorocarbon copolymer as an interlayer between a thicker sheet of copolymer and the fabric. The interlayer copolymer sheet is formulated to have a lower specific melt viscosity than the copolymer of the thicker sheet.

SUMMARY OF THE INVENTION

An improvement in a process for preparing laminates comprised of a thick fluorocarbon copolymer sheet of 5 or more mil thickness and a fabric, the improvement comprising placing as an interlayer between the fabric and thick sheet of a thin sheet of a fluorocarbon copolymer which has a specific melt viscosity sufficiently low to enable the copolymer to wet and penetrate the fabric at fabrication temperatures and which has a specific melt viscosity lower than the specific melt viscosity of the fluorocarbon copolymer of the thick sheet, and then integrally bonding the laminate by means of heat and pressure; wherein the fluorocarbon copolymer of the interlayer is a copolymer comprising 50-95% by weight tetrafluoroethylene, and 50-5% by weight fluoroolefin having the formula $$CF_2 = CFY$$

wherein Y is a $C_1$ to $C_8$ perfluoroalkyl radical, or 99-93% by weight tetrafluoroethylene and 7-1% by weight perfluoroalkyl vinyl ether in which the alkyl group contains 1 to 5 carbon atoms.

DETAILED DESCRIPTION OF THE INVENTION

The fabric useful in the present invention can be woven or knit.

Woven fabrics are these characterized by any of the well-known crisscross weaves and by moderate or low elongation or extension along either major axis of the fiber weave.

Preferably, it is composed of continuous yarn or set of yarns in the form of courses or rows of loops, each row of loops being caught in the previous row of loops, this fabric can be described as a knitted fabric. Any type of knit can be used in the fabric employed in the present invention. For example, in addition to the plain pearl knit, such knits as the flat jersey knit, the raschel knit, the rib stitch and the tricot stitch can be used. Fabrics that are knitted double and are held together by binding stitches, which are known as double knit fabrics, can also be used. Variations on the basic knitting stitch can be used such as the tuck stitch, wherein periodically the knitting operation loops at desired intervals are left unknitted so as to form knobby or bumpy surface on one or both sides of the knitted fabric which increases its apparent thickness. All these types of knits have in common the feature of the loops of the yarn making up the fabric extending from each surface of the fabric, and of being extensible in all directions. Generally, an extensibility without breaking of at least 10% in all directions is desired for a knit fabric, with some applications requiring at least 20% extensibility based on the original dimension of the fabric. The laminate incorporating the fabric (whether woven or knit) will have a relatively corresponding extensibility or lack of extensibility.

The fabric can be knit or woven of any fiber which has temperature stability at the temperature or temperatures required during the processing. Suitable fibers include natural or synthetic fibers, including, for example, metal, polyimide, carbon fibers, glass fibers, graphite fibers, ceramic fibers, asbestos fibers, aromatic aramide fibers, etc. Because of their desirable physical properties, glass fibers are more preferred. Glass fiber yarn is used instead of glass monofilament because of the relative fragility of the monofilament.

When the fabric is woven, carbon and graphite fibers are particularly preferred. When the fabric is knit, glass and aromatic aramide fibers are particularly preferred.

The fluorocarbon copolymer of the interlayer sheet may be the same copolymer as that of the thick fluorocarbon copolymer sheet. However, when the copolymers are the same, the copolymer of the interlayer sheet is prepared so that its specific melt viscosity is lower than that of the copolymer of the thick sheet. This difference in specific melt viscosity can be produced by varying the amount of initiator used during the copolymerization process. For example, to obtain copolymers of high specific melt viscosity, the amount of initiator is decreased; to obtain copolymers of low melt viscosity, it is increased.

Additionally, even when the fluorocarbon copolymer of the interlayer sheet is different from the fluorocarbon copolymer of the thick sheet, the fluorocarbon copolymer of the interlayer sheet will have a lower specific melt viscosity of the polymer of the thick sheet.

The lower specific melt viscosity of the copolymer of the interlayer sheet alows it to be flowable at the temperatures required to laminate the thick sheet to the fabric. This flowability enables the interlayer copolymer to wet and be embedded into the fabric and also to fuse with the fluorocarbon copolymer of the thicker sheet.

By the term "specific melt viscosity" as used herein, is meant the apparent melt viscosity as measured at 372° C. under a shear stress of 6.5 pounds per square inch. The values herein referred to are determined using a melt indicator of the type described in the American Society of Testing Materials Test D-1238-57 T, modified for corrosion resistance to embody a cylinder and orifice of "Ampco" aluminum bronze and a piston weighing 60 grams, having a "Stellite" cobalt-chromium-tungsten alloy tip. The resin is charged to the 0.375-inch I.D. cylinder which is held at 372° C. ± 0.5° C., allowed to come to an equilibrium temperature during 5 minutes, and extruded through the 0.0825-inch diameter, 0.315-inch long orifice under a piston loading of 5,000 grams. The specific melt viscosity in poises is calculated as 53,150 divided by the observed extrusion rate in grams per minute.

The fluorocarbon copolymer of interlayer sheet contains tetrafluoroethylene (TFE) copolymerized with either a fluoroolefin or a perfluoro(alkyl vinyl ether).

When the TFE is copolymerized with a fluoroolefin, the copolymer will contain about 50–95% by weight of TFE units, and about 50–5% by weight of hexafluoropropylene or other suitable fluoroolefin having the formula $CF_2=CFY$, wherein Y is a $C_1$ to $C_8$ perfluoroalkyl radical. Copolymers of this type are described in U.S. Pat. Nos. 2,833,686; 2,946,763; and 3,085,083.

When the TFE is copolymerized with a perfluoroalkyl vinyl ether, the copolymer will contain about 99 to 93% by weight of TFE units, and about 1–7% by weight of perfluoro(alkyl vinyl ether) in which the alkyl group contains 1 to 5 carbon atoms.

Copolymers of this type are disclosed in U.S. Pat. Nos. 3,159,609; 3,180,895; and 3,132,233; all granted to Harris and McCane; and U.S. Pat. No. 3,770,711, granted to Harteg and Harsen.

Especially useful is a tetrafluoroethylene/hexafluoropropylene copolymer (FEP). A preferred FEP copolymer has a hexafluoropropylene (HFP) content between about 6.75 and about 27 weight percent of the copolymer and more preferably between about 14 and about 18 weight percent. The copolymers are prepared by reacting tetrafluoroethylene and hexafluoropropylene in an aqueous system containing a dispersing agent and a free radical polymerization initiator according to procedures disclosed in Couture U.S. Pat. No. 3,132,124.

The fluorocarbon copolymer sheet, useful as an interlayer, can have a thickness of from a minimum of about 1 mil (at this thickness handling difficulties occur), to a maximum of no more than one-half the thickness of the fabric used. Preferred because of availability and ease of handling is a thickness of 2–5 mil. The interlayer sheet will be composed of a fluorocarbon copolymer having a sufficiently low specific melt viscosity to enable the copolymer to wet and penetrate the fabric at fabricating temperature. Preferably, when the copolymer is FEP, the specific melt viscosity will be from $5-25 \times 10^4$ poises, and more preferably from $6-10 \times 10^4$ poises.

The fluorocarbon copolymer sheet utilized can be a performed film, a freshly formed extrudate applied prior to its being completely cooled, or a dispersion or paste containing the fluorocarbon copolymer which is applied in several coats until the minimum thickness of about 1 mil is obtained.

Fluorocarbon polymers utilizable in the thick sheet include the melt-fabricable perhalopolyfluoroethylene copolymers. The melt-fabricable copolymers of perhalopolyfluoroethylene include chlorotrifluoroethylene and tetrafluoroethylene (TFE) copolymerized with fluoroolefins such as hexafluoropropylene, or with perfluoroalkyl vinyl ether monomers such as perfluoropropyl- or ethyl-vinyl ether, or with nonfluorinated monomer such as alkylenes, e.g., ethylene, including the tetrafluoroethylene/ethylene binary polymers and terpolymers disclosed in U.S. Pat. Nos. 3,624,250 and 3,342,777.

Preferably the copolymer contains TFE copolymerized with fluoroolefin. More preferably, such a copolymer will contain about 50–95% by weight of TFE units and about 50–5% by weight of hexafluoropropylene or other suitable fluoroolefin having the formula $CF_2=CFY$, wherein Y is a $C_1$ to $C_8$ perfluoroalkyl radical. Copolymers of this type are described in U.S. Pat. Nos. 2,833,686; 2,946,763; and 3,085,083.

Especially useful is a tetrafluoroethylene/hexafluoropropylene copolymer (FEP). A preferred FEP copolymer has a hexafluoropropylene content between about 6.75 and about 27 weight percent of the copolymer and more preferably between about 14 and about 18 weight percent. The copolymers are prepared by reacting tetrafluoroethylene and hexafluoropropylene in an aqueous system containing a dispersing agent and a free radical polymerization initiator according to procedures disclosed in Couture U.S. Pat. No. 3,132,124.

Another copolymer preferred for use in the thick sheet is tetrafluoroethylene copolymerized with perfluoroalkyl vinyl ether monomers, such as perfluoropropyl- or ethyl-vinyl ether, in which the alkyl group contains 1 to 5 carbon atoms. Preferably, the copolymer will contain about 99 to 93% by weight of tetrafluoroethylene units, and about 1–7% by weight of perfluoroalkyl vinyl ether.

The thick fluorocarbon copolymer sheet can have a thickness of from about 5–100 mils and above if desirable. Preferably, the thickness will be from 20–100 mil, more preferably, 50–100 mil. The thick fluorocarbon copolymer sheet will be composed of a fluorocarbon copolymer having a specific melt viscosity higher than that of the interlayer sheet. Preferably, the specific melt viscosity will be $30-60 \times 10^4$ poises, and more preferably, from $40-60 \times 10^4$ poises. These are preferred because of their availability.

The thick fluorocarbon copolymer sheet can be applied as a preformed film or as a freshly formed, not completely cooled, extrudate.

The laminates of fabric, interlayer sheet, and thick sheet can be formed by various means. The following are illustrative:

(a) The fabric, then the interlayer sheet and, lastly, the thick sheet are stacked on top of one another; and then sufficient heat and pressure are applied to cause the surface of the fabric to be embedded into the interlayer sheet.

(b) The fabric and interlayer sheet can be prelaminated by heat and pressure. This prelaminate is then made into a laminate by stacking the thick sheets on top of the prelaminate and apply sufficient heat and pressure to form the laminate.

(c) The fabric can be cut to conform to the shape of a mold, and the interlayer prelaminated to it in a conventional vacuum forming machine, and then the thick sheet laminated to the prelaminate.

The temperature used during lamination will usually be at least as high as the crystalline melting temperature of the fluorocarbon copolymer of the thick sheet and will further depend on the pressure and dwell time of the heat and pressure operation.

Preferably, when the copolymer of the thick sheet is FEP, the temperature used during lamination will be from about 280° C. to 295° C., but can be at any temperature high enough so the interlayer copolymer can flow into the fabric. The pressure used should not be so high as to permanently crush the exposed loops of a knit fabric. The pressure will preferably be no more than 30 pounds per square inch when the fabric is woven and no more than 40 pounds per square inch when the fabric is knit.

While applying pressure to a knit fabric invariably causes some slackening of the loops of the fabric, release of the pressure, if not excessive, enables the exposed loops not embedded in the sheet to spring back toward the original form. By reheating the laminate, the springback of the exposed loops is increased.

The embedment of the fabric into the interlayer sheet is characterized by at least sufficient penetration of yarn of the fabric into the sheet to provide a mechanical bond between the fabric and the sheet. When fabric is knit, the sheet may even encapsulate the loops of one surface of the knit fabric but this condition is not absolutely necessary for all applications, since mechanical bonding is obtained merely by the copolymer, or interlayer sheet, penetrating the yarn fibers or contacting the yarn of the loops through an angle greater than 180° around the yarn circumference or both. While at least this minimum penetration of the interlayer sheet into the fabric is desired, total encapsulation of the fabric by the sheet would be undesirable, because this would deprive the laminate of exposed fabric loops desired for anchoring to a castable material backing. Typically, penetration of the sheet into no more than the average of 50% of the thickness of the fabric, whether woven or knit, is desired. Since the bond between the fabric and the sheet is mechanical, no adhesive coating on the fabric or sheet is needed or desired. The bond between the two sheets of fluorocarbon copolymer, which may have the same melting point but have different melt viscosities, is a fused bond.

The stretchability (or extensibility) of the preferred knit fabric in the resultant laminate enables the laminate to be formed or molded, such as by thermoforming to a shaped article. Thermoforming is the process for drawing the laminate into a three-dimensional article.

The exposed loops of the yarn of the fabric in the laminate serve as an anchor for a layer of castable material which encapsulates the enclosed loops of the fabric and further encapsulates reinforcing material, such as cloth or fiber. According to this embodiment, while the laminate provides a moldable article possessing the surface characteristics of the sheets, the castable material can be used to strengthen the laminate. The castable material can by itself reinforce the laminate or can serve to adhere the laminate to a substrate which, in turn, provides reinforcement. The castable material can be applied to the laminate structure either before stretching or after stretching or otherwise forming a shaped article and will prevent stretching.

Any material which is sufficiently flowable to encapsulate the exposed loops of the fabric of the laminate which is subsequently hardenable to an adhesive or rigid cast material or reinforced cast material can be used as the matrix for the entire portion of the castable material. Preferably, the castable material impregnates the fabric sufficiently to meet the fluorocarbon copolymer sheet in the interior of the fabric. For example, the castable material can be a thermosetting type resin, such as epoxy resin or polyester. Penetration of the castable material into the exposed yarn loops of the fabric mechanically anchors the castable material to the laminate.

Since the castable material is secured to the laminate by mechanical engagement with the fabric, it is important that the yarn of this fabric be strong. For this reason, glass and aromatic aramid are the preferred materials of construction of the fabric for the laminate. The glass also supplies high temperature and corrosion-resistance desired for many applications. The preferred fabric is knitted because of loop density which it provides. The loop density of the fabric should be sufficient to maintain integrity between the fluorocarbon copolymer sheets and a castable material. A plain knit construction obtained by knitting the 3-½ needles per inch provides sufficient loop density for some applications. However, the plain knit obtained by knitting by at least 7 needles per inch is more preferred. The most preferred is a cardigan knit because of its excellent insulative properties.

In the case of double knits, the use of at least 3-½ needles per inch gives better results because the knitting involves two sets of needles, or at least 7 needles. In addition to loop density, the loops should be sufficiently large to provide the bulk desired for enabling their encapsulation by castable material as well as to achieve the extensibility desired. This is accomplished by adjustment of the amount of yarn feed per needle of the knitting machine. The effectiveness of knits where the loop density is borderline can be increased by increasing the loop lengths or bulkiness of the fabric to insure that each loop becomes encapsulated by the castable material. The loops should not be so long, however, that the knitted fabric is unstable during handling. The knitted fabric need not be the same on both sides. For example, the side embedded in the fluorocarbon copolymer sheet can be a relatively smooth side, whereas, the exposed side can be ribbed in order to provide more bulk for impregnation by castable material which ordinarily will not involve pressure, but just the flowability of the castable material.

When the castable material is to provide reinforcement to the laminate, the reinforcing material embedded in the castable material provides further reinforcement. An example of reinforcing material includes glass fibers, roving, and matt which can be used in a conventional laying-up process of coating the fabric with castable material, applying the reinforcing material to the surface of the castable material while still flowable, coating the reinforcing material with additional castable material, applying additional reinforcing material, and so on. This method is especially useful for applying a polyester/glass matt, chopped glass roving backing material to the laminate. Another procedure is to simultaneously coat the fabric surface of the laminate with castable material and chopped glass strands. Still another procedure is the spiral winding technique of laying down continuous filament yarn or roving of glass within the polyester. The thickness of the casting material when used for reinforcement will depend on the strength and rigidity desired.

When used as an adhesive, the thickness of the castable material will depend on the thickness at which the desired adhesive effect is obtained. A preferred adhesive is epoxy resin. Prior to coating the fabric side of the laminate with castable material or prior to making the laminate, any sizing agent that is on the fabric which may interfere with either the fluorocarbon copolymer sheet or castable material penetration into the fabric or which degrades during treatment, can be removed by such operations as heating to burn off the sizing or water and solvent soaking. An agent which makes the fabric more wettable, especially to the castable material, can be applied to the fabric. An example of such an agent is the water-hydrolyzable organo silanes such as those disclosed in German Patent Publication No. 1,954,233.

The laminates produced by this process are useful in general to form articles having the fluorocarbon copolymer sheet as one surface and the fabric as the opposite surface. The fabric provides an anchor to the sheet. The laminates can be used in such applications as structural articles, molds, mold liners, and linings in general for such applications as ventilation hoods, ducts, bench top covers, and conveyor belts, with the need of castable material to back up the laminates depending on the application.

The laminates produced by the present invention are especially useful as a liner, because the linings that are most chemically resistant are also the most difficult to adhere to support surfaces, such as plastic or metal substrates. Once the bond between the lining and the support surface breaks, the resultant void becomes a point of intense corrosion caused by permeation of the chemicals in contact with the lining therethrough. The present invention has the advantage of achieving bonding between the lining and the support surface through the more permanent, less chemically effected mechanical type of bond via the fabric.

One main advantage of this invention is the ability of the laminates having a knitted fabric to be thermoformed. Thermoforming involves a stretching of the fluorocarbon copolymer sheets and extension of the fabric, when knitted, to the shape desired.

One shaped article which can be made from laminate of present invention is a dished head for a chemical process vessel comprising an inner laminate of thick sheet, interlayer sheet, and fabric running immediate to the thickness of the head, and an outer layer of castable material, which can be glass-reinforced polyester.

Dished heads normally have an inside dished radius R which is 80 and 100 percent of the inside diameter $R_1$ of the head and a depth D of at least 20 percent of the inside diameter.

A dished head can also be made by cutting the laminate into orange peel shape piece and piecing and lead-welding together in the dished head configuration.

A process for molding laminates such as to the dished head shape, without creating thin spots in the sheet, involves uniformly heating a sheet of the laminate and allowing it to sag under its own weight to approximately the same surface area as that of the shaped article, followed by shaping the laminate to the article shape desired, and cooling the structure so as to retain this shape.

To explain in greater detail, an oven is used in which is positioned a rectangular frame which supports the periphery of a laminate (fabric side up). The laminate lies over a male mold positioned within the oven and having the shape desired for the inner surface of a dished head. Upon heating, the laminate sags so that its unsupported region takes the shape indicated by the mold which is approximately a catenary curve. The stress throughout the unsupported region of the laminate during this sagging is about equal so that the thinning of the polymer sheet of the laminate is uniform. This sagging is accomplished by a corresponding amount of stretching of the fabric component of the laminate. The temperature of heating used will depend somewhat on the resin employed as the melt-fabricable polymeric sheet in the laminate, but usually the temperature will be well above the crystalline melting temperature of the polymer so that the sagging occurs during heat-up of the oven, and then the heating is stopped when the amount of sagging desired is complete.

The mold is positioned beneath the sagging laminate at a distance wherein when the unsupported region of the laminate touches the mold, the surface area of the sagged laminate and of the mold are about the same. This provides visual indication of when the laminate should be shaped. At this time, a frame is lowered to encompass the mold and allow the laminate to drape over and assume the configuration of the mold. To obtain fitting of the laminate about the vertical circumference of the mold, a vacuum is applied beneath the laminate in this region by supply lines connected to a vacuum source. The vacuum can also be communicated through the mold to its surface to insure desired shaping of the laminate. This use of vacuum to draw the heated laminate down onto the mold can be called "vacuum shaping". The resultant molded or shaped laminate has a fairly uniform sheet thickness (greatest and smallest thickness within 75 percent of one another), and is cooled sufficiently while in contact with the mold to be able to sustain its shape when removed from the mold. The shaped laminate is then released from the frame and is trimmed as desired. The reinforcing castable material backing such as a glass-reinforced polyester or adhesive-metal substrate is then applied to the fabric side of the shaped article as hereinbefore described.

Laminates of the present invention can also be shaped into articles which do not involve thermoforming such as into a cylinder by wrapping the laminate around a mandrel (polymer side facing the mandrel) to meet itself, followed by conventional heat sealing technique to weld the abutting edges of the laminate together. For example, the fabric is stripped back from the abutting edges on the fabric side of the laminate, and the edges and a bend of fluorocarbon copolymer are heated in contact with one another sufficiently that they heat bond together. A castable material can then be applied to the fabric side of the cylinder; in this case the castable material can be glass-reinforced polyester. The cylinder can then be removed from the mandrel and a bead of flurocarbon copolymer can be welded along the abutting edges on the mandrel side of the laminate. The resultant cylinder can be used as the cylindrical section of a process vessel. Alternatively, the castable material can be an adhesive for adhering the cylinder to the interior surface of a metal cylinder for process vessel application. In either event, the sheet of the dished head can be welded through a bead of fluorocarbon copolymer along the upper edge of the head to the lower edge of sheet of the cylinder to form a continuous lining between the bottom and side of the process vessel.

Another application for laminates of the present invention is to form a duct of much greater length to diameter ratio wherein the inner surface is the melt-fabricable copolymer sheet and the outer surface is the fabric, such as a tube. Such duct can be made by the same conventional technique as the cylinder. The stretchability of the laminate enables its ends to be heated and flared for joining with other ducts or cylindrical shapes.

As in the case of dished head and cylinder, respectively, the duct can be combined with reinforcing castable material, such as glass-reinforced polyester, to form an essentially plastic rigid duct. Alternatively, the castable material can be an adhesive which bonds the laminate to the inner wall of metal tubing to form a lined duct.

Laminates of the present invention can be shaped into cylindrical shapes having cross sections other than round, e.g., square or rectangular cross-sectional shapes can be formed.

Laminates of the present invention are further illustrated by the following examples:

EXAMPLE 1

A flexible sheet material is prepared as follows:

A fabric (Layer A) is placed in superposed contact with one surface of an interlayer sheet (Layer B) and the opposite surface of the interlayer sheet is placed in superposed contact with one surface of a thick sheet (Layer C).

The fabric of Layer A is a knit-glass fabric of the following description:

½ Cardigan
10 Courses per inch
150/4 Beta yarn
24.5 Ounces per square yard

The interlayer sheet of Layer B is a 2-mil thick film which was prepared by melt extrusion from a tetrafluoroethylene/hexafluoropropylene copolymer (FEP), wherein the hexafluoropropylene content is 16% by weight, the copolymer characterized by a specific melt viscosity of about $8 \times 10^4$ poises at 372° C.

The thick sheet of Layer C is a 60-mil thick film which was prepared by melt extrusion from a tetrafluoroethylene/hexafluoropropylene copolymer, wherein the hexafluoropropylene content is 16% by weight, the copolymer characterized by a specific melt viscosity of about $50 \times 10^4$ poises at 372° C.

The layers are integrally bonded by means of heat and pressure. The bonding of the layers is accomplished by pressing the assembled materials through a rotary-type heated press (with the fabric in contact with the rotary drum of the press). The assembly is subjected to a pressure of about 40 pounds per square inch at a temperature of about 282° C. for about 2 minutes. The rotary press is of the type sold as a Rotocure® by Adam and United Corporation.

The product is flexible and the fabric is embedded about one-half its depth into the FEP film. The level of adhesion between the FEP film and the fabric, as measured by the ASTM-D-751 peel test, is greater than 18 pounds per inch.

EXAMPLE 2

A flexible sheet material is prepared as in Example 1, except that Layer C is an FEP film 90–95 mils thick.

This product is flexible and the fabric is embedded about one-half of its depth into the FEP film. The level of adhesion between the FEP film and the fabric, as measured by the ASTM-D-751 peel test, is greater than 18 pounds per inch.

EXAMPLE 3

Three rotary-type drums are positioned in a vertical straight line series. The first (top) and third (bottom) drums rotate in the same direction, e.g., clockwise, and the second (middle) drum rotates in the opposite direction, e.g., counterclockwise. The drums are sufficiently close that a work object removed from one drum quickly comes in contact with the next drum.

An extruder is associated with the drums. The extruder is positioned so that an extrudate, freshly extruded through an extruder die, can be placed onto and in direct contact with the middle drum.

The work object travels through the drum series at a rate of approximately one foot per minute and is in contact with each drum for approximately two minutes.

The first drum is a pressure roll having a face temperature of 295°–305° C. The second drum is a casting drum having a face temperaure of 195°–205° C. The third drum is a cooling drum having a face temperature of 35°–70° C.

The extruder die has an opening sufficiently large to form an extrudate which is 60 mils thick and 20 inches wide. The extruding is at a temperature of 327° C.

The flexible sheet material is formed as follows:

The fabric of Example 1 is pre-laminated to the interlayer of Example 1 by placing the fabric with the interlayer superimposed upon it, in contact with the first drum (fabric side facing the drum). The heat of the pressure roll pre-laminates the two layers. The pre-laminate then passes onto the casting drum upon which the extrudate has already been positioned. The interlayer side of the pre-laminate comes into contact with the extrudate. The laminate is bonded while passing around the casting drum.

The polymer of the extrudate is the same as that of the thick sheet of Example 1. The laminate is then cooled by passing around the cooling drum.

The laminate has the same characteristics as the product formed in Example 1.

I claim:

1. An improvement in a process for preparing a laminate comprising a fluorocarbon copolymer top sheet and a knitted glass fabric, the improvement comprising placing an interlayer between the knitted glass fabric and the top sheet, said interlayer consisting essentially of a sheet about 1–5 mils thick of a fluorocarbon copolymer having a specific melt viscosity from 5 to $25 \times 10^4$ poises being sufficiently low to enable the copolymer to wet and penetrate the fabric at fabrication temperatures and lower than the specific melt viscosity of the fluorocarbon copolymer of the top sheet, said top sheet being about 5–100 mils thick and having a specific melt viscosity of $30$–$60 \times 10^4$ poises, and then integrally bonding the laminate by means of heat and pressure; wherein the fluorocarbon copolymer of the interlayer is selected from the group consisting of a copolymer of tetrafluoroethylene/hexafluoropropylene consisting essentially of 93.25–73 percent by weight of tetrafluoroethylene and 6.75–27 percent by weight of hexafluoropropylene or a copolymer of tetrafluoroethylene/perfluoro(alkyl vinyl ether) having 2–3 carbon atoms in the alkyl group consisting essentially of 99-93 percent by weight of tetrafluoroethylene and 1-7 percent by weight of perfluoro (alkyl vinyl ether).

2. The process of claim 1 wherein the temperature used to heat the laminate to bond the interlayer to the fabric and top sheet is about 280° and 295° C.

3. The process of claim 1 in which the fluorocarbon polymer top sheet consists essentially of tetrafluoroethylene/hexafluoropropylene copolymer having a hexafluoropropylene content of about 6.75 to 27% by weight.

4. A laminate produced by the process of claim 1.

* * * * *